United States Patent [19]

Kaneko

[11] 4,041,526
[45] Aug. 9, 1977

[54] CONTROL OF AUTOMATIC COLOR CONTROL AND COLOR KILLER CIRCUITS IN VIDEO SIGNAL REPRODUCING APPARATUS

[75] Inventor: Shinji Kaneko, Atsugi, Japan

[73] Assignee: Sony Corporation, Tokyo, Japan

[21] Appl. No.: 623,409

[22] Filed: Oct. 17, 1975

[30] Foreign Application Priority Data

Oct. 21, 1974 Japan .................. 49-121156

[51] Int. Cl.² .................. H04N 5/76; H04N 9/49
[52] U.S. Cl. .................. 358/4; 358/26; 358/127; 360/28; 358/27
[58] Field of Search .................. 358/4, 26, 8, 127, 27; 360/27, 28; 178/6.6 R

[56] References Cited

U.S. PATENT DOCUMENTS

| 2,982,812 | 5/1961 | Rhodes et al. | 358/26 X |
| 3,571,496 | 3/1971 | Slavik | 358/26 |
| 3,732,358 | 5/1973 | Harwood | 358/26 X |
| 3,757,034 | 9/1973 | Fujita | 358/4 |
| 3,860,954 | 1/1975 | Tsuchiya | 358/26 |
| 3,975,759 | 8/1976 | Taniguchi et al. | 358/4 |

*Primary Examiner*—John C. Martin
*Assistant Examiner*—Aristotelis M. Psitos
*Attorney, Agent, or Firm*—Lewis H. Eslinger; Alvin Sinderbrand

[57] ABSTRACT

In apparatus for reproducing a signal recorded on a magnetic tape or other record medium and which includes a signal band containing an information signal, such as the chrominance component of a color video signal, and a reference signal of a predetermined frequency occurring only during spaced intervals, such as, the burst signal; the mentioned band of the reproduced signal is applied to a variable gain amplifier for controlling the level of the chrominance component, a burst gate receives the level-controlled output of the amplifier and is gated during the intervals of the burst signal to provide an output during each such interval, a crystal filter tuned to the frequency of the burst signal receives the output of the burst gate so as to pass only the burst signal, and the gain of the variable gain amplifier is controlled in accordance with the combined levels of the outputs of the burst gate and the crystal filter, respectively. In providing the gain control signal for the variable gain amplifier, the outputs of the burst gate and crystal filter may be both level detected and the resulting D.C. voltages then added to provide the gain control signal, or only one of such outputs may be level detected and added to the other output to provide an added signal which is then level detected to provide the gain control signal. The combined levels of the outputs of the burst gate and the crystal filter are also preferably employed to control a color killer circuit in the reproducing apparatus.

10 Claims, 3 Drawing Figures 4,041,526

CONTROL OF AUTOMATIC COLOR CONTROL AND COLOR KILLER CIRCUITS IN VIDEO SIGNAL REPRODUCING APPARATUS

BACKGROUND OF THE INVENTION

1. Field of the Invention

This invention relates generally to the recording and reproducing of color and momochrome or black-and-white video signals, and more particularly is directed to improvements in the automatic color control and color killer circuits of apparatus, such as, the so-called VTR, for reproducing such video signals.

2. Description of the Prior Art

In the recording of video signals on magnetic tape, for example, by means of a VTR, the tape is guided in a helical path about a portion of the periphery of a guide drum having rotary heads associated therewith so that, as the tape is advanced longitudinally, the heads successively record video signal information in a series of parallel record tracks which extend obliquely across the tape. The same apparatus may be used to reproduce or play back the previously recorded video signal information by causing the rotary heads to scan the successive oblique record tracks. Video signals are divided into field intervals, two of which comprise a frame, and line intervals, with each line interval including a blanking interval during which synchronizing signals are transmitted to control the scanning apparatus of a television receiver. Usually, when recording video signals by means of a VTR, a field interval is recorded in each of the oblique tracks on the magnetic tape. Color video or television signals, as transmitted, consist of a luminance or brightness signal and a chrominance component or signal comprised of modulated color subcarriers which, for example, in the case of the NTSC signal, have a standard frequency of approximately 3.58 MHz. Further, the band of the chrominance component contains burst signals occurring during the line blanking intervals and having the standard frequency of the color subcarrier. In such color video signals, as transmitted, the frequency band of the chrominance component is within that of the luminance signal.

When recording color video signals as described above, particularly for reproduction by means of a VTR intended for home use, it is well known to separate the luminance signal and the chrominance component, whereupon, the luminance signal frequency-modulates a suitable carrier to provide a frequency-modulated luminance signal, and the band of the chrominance component is shifted, that is, the chrominance component is frequency-converted, for example, from its standard carrier frequency of 3.58 MHz to a carrier frequency of 688 KHz., so as to occupy a frequency band below that of the frequency-modulated luminance signal. The frequency-converted chrominance component is then combined with the frequency-moldulated luminance signal to provide a composite signal which is recorded, as aforesaid. In reproducing the color video signal from such recorded composite signal, the frequency-modulated luminance signal and the frequency-converted chrominance component are separated from the reproduced composite signal, for example, by a high pass filter and a low pass filter, respectively, the separated frequency-modulated luminance signal is demodulated to derive the luminance signal, and the separated frequency-converted chrominance component is reconverted to its original or standard carrier frequency, for example, of 3.58 MHz, and is then combined with, or added to the luminance signal to constitute the reproduced color video signal. The amplitude or level of the chrominance component in the reproduced composite signal determines the color level of the reproduced color video signal. When the VTR has two or more rotary magnetic heads which successively scan the tape, as is usually the case, such heads may have different recording and/or reproducing characteristics with the result that the level or amplitude of the reproduced chrominance component will vary or change for successive field intervals. Further, the gains of recording and reproducing amplifiers of the VTR may be adjusted differently during the recording and reproducing, respectively, of the composite signal, particularly when the recording and reproducing operations are performed with different VTRs, with the result that the level of the reproduced chrominance component, and hence the color level of the reproduced color video signal, will not correspond to the color level of the original color video signal. Finally, due to the high speed with which each of the rotary magnetic heads scans the tape, the contact pressure of the head against the tape may vary for successive field intervals, and even during each field interval, to cause variations or irregularities in the level or amplitude of the reproduced chrominance component.

In order to avoid changes in the color level of the reproduced color video signal due to the above described variations or irregularities in the level of the reproduced chrominance component, existing VTRs are provided with an automatic color control (ACC) circuit which includes a variable gain amplifier for the reproduced chrominance component and a gain control circuit for such amplifier which adjusts the gain thereof so as to provide the reproduced chrominance component at its output with a stable level or amplitude. In the conventional ACC circuit for a VTR as described above, the burst signal is extracted from the reproduced chrominance component following the passage thereof through the variable gain amplifier, and either before or after its reconversion to the original or standard carrier frequency, and the level of the extracted burst signal is detected to provide the gain control signal for the variable gain amplifier through which the reproduced chrominance component has its level controlled. The detected level of the extracted burst signal is also used to control a color killer circuit included in the reproducing system of the VTR and by which the adding of the frequency-reconverted chrominance component to the luminance signal is halted when the detected level of the extracted burst signal is below a predetermined value and thereby indicates that the level of the reproduced chrominance component is insufficient to provide reliable color image reproduction.

However, upon recording a monochrome or black-and-white video signal with a VTR of the described type, it is very common to increase the band width of the lower side band of the frequency-modulated luminance signal which is recorded. Thus, in recording a monochrome video signal, the band of the frequency-modulated luminance signal which is recorded will extend, at its lower side, into the frequency band that would be occupied by the frequency-converted chrominance component during the recording of a color video signal. During the reproduction of a monochrome video signal recorded, as aforesaid, the circuit arrangement provided for detecting the level of the burst signal when reproducing a color video signal may erroneously detect the lower side band components of the luminance signal and thereby cause erroneous or misoperation of the color killer circuit.

In order to avoid such erroneous or misoperation of the color killer circuit, it has been proposed to interpose, in the circuit for detecting the burst signal, a crystal filter which is tuned to, or resonant at the frequency of the extracted burst signal so that only the existence of the latter, when reproducing a color video signal, will be detected. Although such crystal filter prevents misoperation of the color killer circuit when reproducing a monochrome video signal, the crystal filter gives rise to unstable operation of the ACC circuit when reproducing a color video signal. More specifically, the crystal filter has an extremely high Q or resonant factor so that ringing waves are generated at each interval when the burst signal is applied to the filter. The amplitudes of such ringing waves are not respresentative of the level of the burst signal, or of the reproduced chrominance component, and, therefore, the ACC circuit has a slow or sluggish response. Further, in a VTR, the reproduced composite signal is subject to time base errors, that is, the burst signal extracted from the band of the reproduced chrominance component does not always have precisely the standard carrier frequency. Since the crystal filter sharply detects any variation of the extracted burst signal frequency from the standard frequency at which the filter is resonant, such frequency variation of the extracted burst signal is falsely identified as a change or variation in the level of the reproduced chrominance component for which the ACC circuit seeks to compensate erroneously.

OBJECTS AND SUMMARY OF THE INVENTION

Accordingly, it is an object of this invention to provide an apparatus for reproducing a recorded signal, for example, a VTR as aforesaid, and which avoids the above-described problems encountered by the existing apparatus.

More particularly, an object of this invention is to provide an apparatus for reproducing a recorded signal, for example, a VTR having ACC and color killer circuits as aforesaid, and which avoids misoperation of the color killer circuit when the recorded signal is a monochrome video signal and also avoids sluggish or false response of the ACC circuit when the recorded signal is a color video signal.

In accordance with an aspect of this invention, an apparatus for reproducing a signal recorded on a record medium and which includes an information signal, such as the chrominance component of a color video signal, and a reference signal of a predetermined frequency occurring only during spaced intervals, for example, the burst signal of a color video signal, comprises transducer means for reproducing the signal recorded on the record medium, a variable gain amplifier receiving the reproduced signal and providing a controlled level reproduced signal, gate means receiving the controlled level reproduced signal and being controlled in synchronism with said spaced intervals so as to provide a first output signal during each of said intervals, filter means tuned to said predetermined frequency and receiving said first output signal and passing only said reference signal therein as a second output signal from said filter means, and means for controlling the gain of said variable gain amplifier in accordance with the combined levels of said first and second output signals. The means for controlling the gain of the variable gain amplifier may include a level detector for detecting the level of one of said first and second output signals, an adder for superposing the output of the level detector on the other of said first and second output signals so as to provide a combined output signal, and a level detector for detecting the level of the combined output signal and providing a corresponding gain control signal for the variable gain amplifier. Alternatively, the means for controlling the gain of the variable gain amplifier may include first and second level detectors for respectively detecting the levels of said first and second output signals, and an adder for adding the levels detected by the first and second level detector and providing a corresponding gain control signal for the variable gain amplifier.

In a preferred embodiment of the invention, the combined levels of the output signals from the said gate means and filter means, respectively, are also employed for controlling the operation of a color killer means.

The above, and other objects, features and advantages of the invention, will be apparent in the following detailed description of illustrative embodiments which is to be read in connection with the accompanying drawings.

DESCRIPTION OF THE PREFERRED EMBODIMENTS

Figure 1:
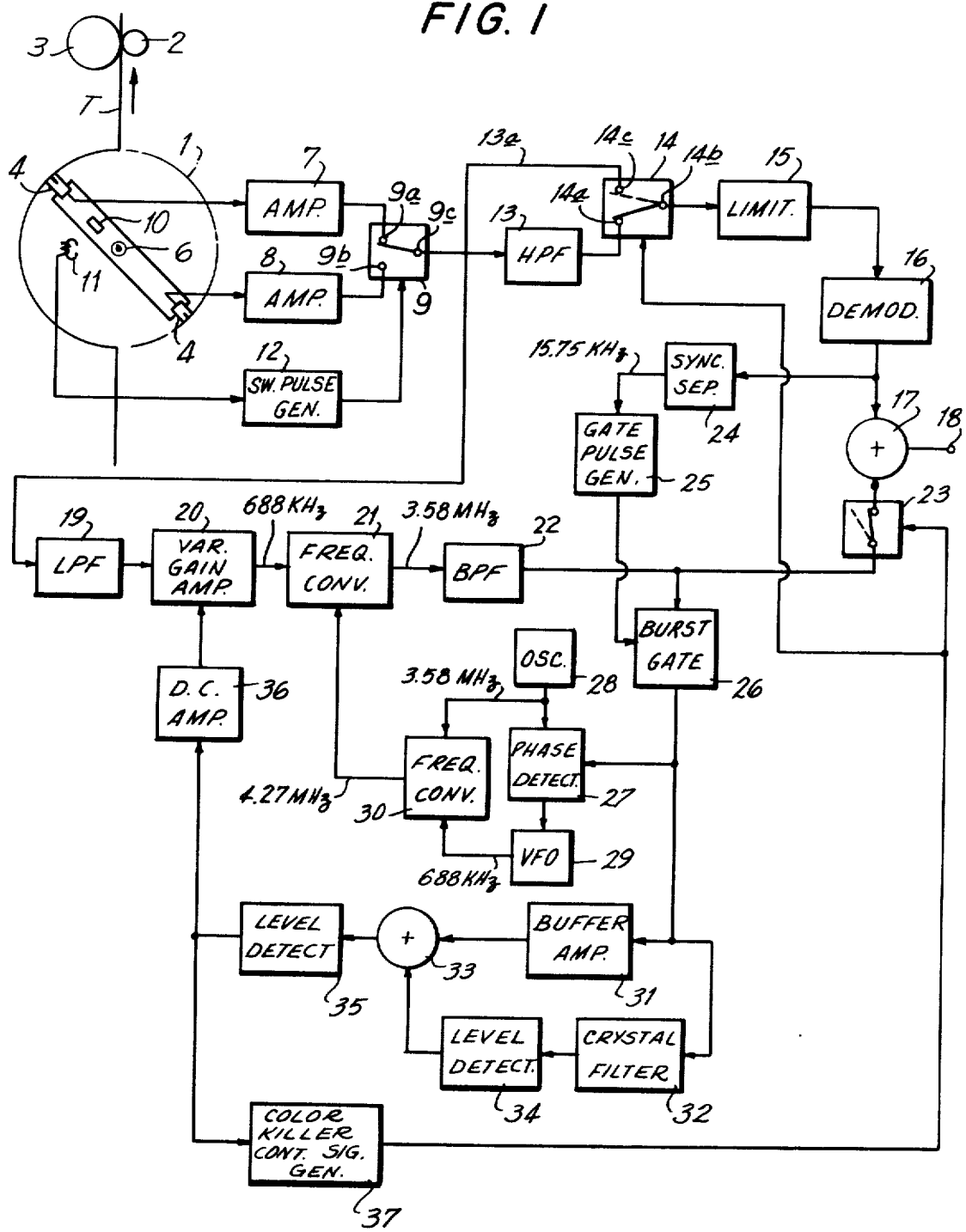
FIG. 1 is a schematic diagram illustrating a video signal reproducing apparatus having ACC and color killer circuits which are controlled in accordance with an embodiment of the present invention.

Referring to the drawings in detail, and initially to FIG. 1 thereof, it will be seen that the invention is there shown applied to a video tape reproducing apparatus or VTR of the type in which a magnetic tape T is guided in a helical path about a portion of the periphery of a guide drum 1, shown in broken lines, and the tape is advanced longitudinally, for example, by a rotated capstan 2 against which the tape is engaged by means of a pinch roller 3. A pair of diametrically opposed, rotary magnetic heads or transducers 4 associated with guide drum 1 are mounted, for example, at the opposite ends of a support arm 5 carried, at its center, by a rotated shaft 6 coaxial with the guide drum, so that heads 4 move in a circular path that substantially coincides with the periphery of guide drum 1. As a result of the longitudinal advancement of tape T and the rotary movement of heads 4, the latter successively scan a series of parallel record tracks extending obliquely across the tape, and in which signals representing either a color video signal or a momochrome or black-and-white video signal have been previously recorded. As is usual, the signal recorded in each oblique record track may represent one field interval of the video signal so that the diametrically opposed rotary heads 4 are operative alternately to reproduce recorded signals corresponding to successive fields of a video signal.

As is well known, color video or television signals, as transmitted, consist of a luminance or brightness signal and a chrominance component or signal comprised of modulated color subcarriers which, for example, in the case of an NTSC signal, have a standard frequency of approximately 3.58 MHz, with the band of the chrominance component containing burst signals occurring during the line blanking intervals and having the standard frequency of the color sub-carriers. Further, in such color video signals, as transmitted, the frequency band of the chrominance component is within that of the luminance signal. In recording such color video signals on the tape T for reproduction by means of the illustrated VTR which may be intended for home use, the luminance signal and the chrominance component are separated, whereupon the luminance signal frequency-modulates a suitable carrier to provide a frequency-modulated luminance signal, as indicated at $Y_{FM}$ on FIG. 3, and the band of the chrominance component is shifted, that is, the chrominance component is frequency converted, for example, from its standard carrier frequency of 3.58 MHz to a carrier frequency of 688 KHz, so that the frequency-converted chrominance component indicated at $C_c$ on FIG. 3 occupies a frequency band below that of the frequency-modulated luminance signal $Y_{FM}$. The frequency-converted chrominance component $C_c$ is then combined with the frequency-modulated luminance signal $Y_{FM}$ to provide a composite signal which has its successive field intervals recorded in the parallel oblique record tracks on the tape T.

Figure 3:
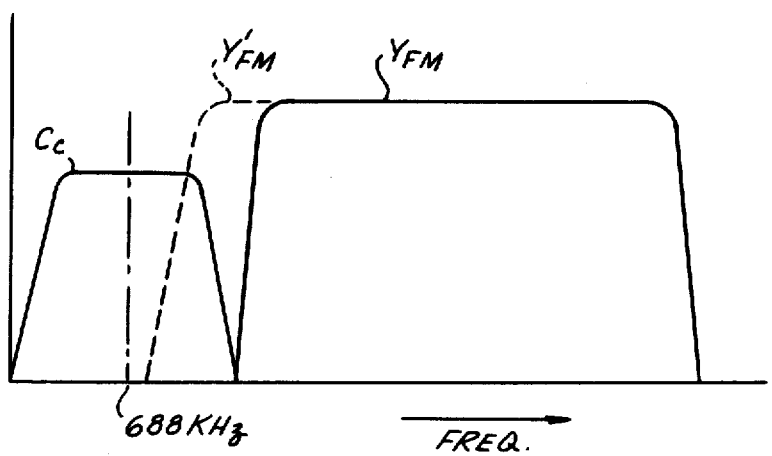
FIG. 3 is a graphic view showing the frequency spectra of recorded composite signals which may be reproduced by the apparatus according to this invention.

When a monochrome or black-and-white video signal is to be recorded on tape T, such video signal does not include a chrominance component and, therefore, as is well known, the band width of the frequency-modulated luminance or brightness signal does not include a chrominance component and, therefore, as is well known, the band width of the frequency-modulated luminance or brightness signal which is recorded is increased at its lower side, for example, as indicated in broken lines at $Y'_{FM}$ on FIG. 3, so that the band of the frequency-modulated luminance signal $Y'_{FM}$, as recorded, extends, at its lower side, into the frequency band that would be occupied by the frequency-converted chrominance component $C_c$ of the recorded composite signal representing a color video signal.

Referring again to FIG. 1, it will be seen that, in the illustrated VTR, the outputs of the diametrically opposed heads 4 are supplied through reproducing amplifiers 7 and 8, to respective inputs 9a and 9b of a switching device 9 having its output 9c alternately connected with the inputs 9a and 9b in synchronism with the rotation of heads 4. Although switching device 9 is illustrated schematically as a mechanical switch having its inputs 9a and 9b in the form of fixed contacts which are alternately engaged by a movable contact constituting the output 9c, it will be apparent that the functions of switching device 9 may be performed by a suitable semiconductor device. In any case, as shown, a magnet 10 rotatable with heads 4 on arm 5 may cooperate with a fixed magnetic head 11 located adjacent the circular path of travel of magnet 10 to provide a pulse during each revolution of arm 5 when the latter is in a predetermined rotational position, and such position indicating pulse from head 11 is applied to a switching pulse generator 12 for example, in the form of a flip-flop, which applies a suitable control signal to switching device 9 so that input 9a is connected with output 9c during the scanning of the tape by the head 4 associated with reproducing amplifier 7, whereas input 9b is connected with output 9c during the scanning of the tape by the head 4 associated with reproducing amplifier 8.

The output from switching device 9, that is, the succession of the amplified signals alternately reproduced by the diametrically opposed heads 4, is applied to a high pass filter 13 which is adapted to pass only the relatively high frequency band occupied by the frequency-modulated luminance signal $Y_{FM}$ of a recorded color video signal. The frequency-modulated luminance signal which passes through filter 13 is applied to an input 14a of a switching device 14 which has an output 14b selectively connected with such input 14a and with another input 14c which has a direct connection 13a to the output of switching device 9. As hereinafter described in detail, switching device 14 is controlled so that, during the reproducing of a color video signal, its output 14b is connected with the input 14a so as to receive only the frequency-modulated luminance signal passed by high pass filter 13, whereas, during the reproducing of a monochrome video signal which is recorded as a frequency-modulated luminance or brightness signal with an expanded lower side band, as at $Y'_{FM}$, output 14b is connected with input 14c so as to bypass filter 13, that is, to receive the complete reproduced signal through the bypass connection 13a. The output of switching device 14 is passed through a limiter 15 to a demodulator 16 by which the frequency-modulated luminance signal is demodulated for deriving the luminance signal which is, in turn, applied to one input of a mixer or adding circuit 17 having its output connected to an output terminal 18.

The output of switching device 9, that is, the reproduced composite signal, is further applied to a low pass filter 19 which is adapted to pass the band of the frequency-converted chrominance component $C_c$. Such frequency-converted chrominance component having a sub-carrier frequency of, for example, 688 KHz, is applied to the input of a variable gain amplifier 20 by which, as hereinafter described in detail, the level or amplitude of the chrominance component is controlled or stabilized. The level controlled output of variable gain amplifier 20 is applied to a frequency converter 21 which also receives a frequency converting signal, as hereinafter described, so as to be effective to reconvert the sub-carriers of the chrominance component to the original or standard frequency, for example, of 3.58 MHz. The frequency-reconverted chrominance component obtained from frequency-converter 21 is passed through a band pass filter 22 to the input of a color-killer switching device 23 which has its output connected to another input of mixer or adding circuit 17. As hereinafter described, color-killer switching device 23 is controlled so as to be normally in its closed or signal conducting condition, as indicated in full lines on FIG. 1, during the reproducing of a color video signal for applying the chrominance component of such signal to adding circuit 17 where it is combined with the luminance signal to provide a color video signal at the output terminal 18. On the other hand, during the reproducing of a monochrome video signal, or when the level of the chrominance component, even after correction by the variable gain amplifier 20, is insufficient to provide reliable color image reproduction during the reproducing of a color video signal, switching device 23 is actuated to its open condition indicated in broken lines on FIG. 1, so that mixer or adding circuit 17 will receive only the luminance or brightness component from demodulator 16 and provide a monochrome or black-and-white video signal at output terminal 18.

Although switching devices 14 and 23 are schematically illustrated as mechanical switches, it is apparent that the above described functions thereof may be similarly performed by suitable semiconductor devices.

As is well known, in order to obtain the frequency converting signal for causing frequency converter 21 to reconvert the chrominance component of the reproduced composite signal from its carrier frequency of 688 KHz back to its original or standard frequency of 3.58 MHz, a sync separator 24 is provided for extracting the horizontal or line synchronizing signal, for example, from the output of demodulator 16, and such horizontal synchronizing pulse is applied to a gate pulse generator 25 which is thereby made effective to open or gate a burst gate 26 during each horizontal or line blanking interval. The burst gate 26 is connected to the output of band pass filter 22, and thus, during the reproducing of a color video signal, gate 26 derives or extracts the burst signal from the chrominance component which has been reconverted to the original or standard carrier frequency. The burst signal extracted by gate 26 is applied to a phase detector 27 which also receives the output of a fixed oscillator 28, for example, having the standard frequency of 3.58 MHz. The phase detector 27 compares the phase of the burst signal from gate 26 with the standard signal from oscillator 28 and, in response to any phase deviation therebetween suitably adjusts a variable frequency oscillator 29 which has a center frequency of, for example, 688 KHz. The output of fixed oscillator 28 and the output of variable frequency oscillator 29 are applied to a frequency converter 30 so as to obtain the frequency converting signal applied to frequency converter 21 and which, in the example being described, has a frequency of appromixately 4.27 MHz.

Generally, in accordance with this invention, the output of burst gate 26 is also applied to a filter tuned to the frequency of the burst signals, that is, 3.58 MHz, so as to pass only the burst signal, and the gain of the variable gain amplifier 20 is controlled in accordance with the combined levels of the output of burst gate 26 and of such filter, respectively. More specifically, in the embodiment of the invention illustrated on FIG. 1, the output of burst gate 26 is shown to be applied to a buffer amplifier 31 and to a crystal filter 32 which, as mentioned above, is tuned to a frequency of 3.58 MHz. The output of buffer amplifier 31 is applied to one input of an adding circuit 33, while the output of crystal filter 32 is applied to a level detector 34 which detects the level of the burst signal passing through filter 32 during the reproducing of a color video signal and produces a corresponding DC voltage or signal which is applied to another input of adding circuit 33. The adding circuit 33 provides a combined output signal in which the output of buffer amplifier 31, in the form of a carrier wave, is superimposed on the DC voltage or signal from detector 34 corresponding to the level of the output signal from filter 32. Finally, such combined output signal from adding circuit 33 has its level detected by a level detector 35 to provide a corresponding DC voltage or signal which is applied through a DC amplifier 36 to the variable gain amplifier 20 as the gain control signal for the latter.

Since the level of the burst signal derived or extracted by burst gate 26 during the reproduction of a color video signal corresponds to the level of the reproduced chrominance component after passage thereof through variable gain amplifier 20, it will be apparent that the gain control signal produced, as described above, may be made effective to maintain a substantially constant or predetermined level of the chrominance component as applied to the mixer or adding circuit 17 so long as the level of the reproduced chrominance component is within a ragne that can be corrected by the variable gain amplifier 20.

In accordance with this invention, the output of level detector 35 is also applied to a color-killer control signal generator 37 which controls switching devices 14 and 23. So long as the DC output of level detector 35 is above a predetermined value indicative of the reproduction of a color video signal with the chrominance component thereof being at a level sufficient to provide reliable color image reproduction, color killer control signal generator 37 maintains switching devices 14 and 23 in the conditions thereof represented in full lines on FIG. 1 so that only the frequency-modulated luminance signal $Y_{FM}$ passing through high pass filter 13 is applied through switching device 14 and limiter 15 to demodulator 16 for supplying the demodulated luminance signal to adding circuit 17, while the reproduced chrominance component, which has its level controlled in amplifier 20 and its carrier frequency reconverted to the standard frequency in frequency converter 21, is applied through switching device 23 to adding circuit 17 for obtaining the reproduced color video signal at output terminal 18. However, when the level of the DC output signal from level detector 35 falls below a predetermined value, for example, when a monochrome video signal is being reproduced or when the level of the reproduced chrominance component is so low as to prevent its full correction by variable gain amplifier 20 during the reproduction of a color video signal, color killer control signal generator 37 switches over switching devices 14 and 23 to the conditions illustrated in broken lines on FIG. 1. When switching devices 14 and 23 are switched over, as aforesaid, high pass filter 13 is bypassed so that the entire reproduced signal is applied to limiter 15 and thence through demodulator 16 to adding circuit 17, while any portion of the reproduced composite signal that might pass through low pass filter 19 to variable gain amplifier 20 and thence to frequency converter 21 is isolated from adding circuit or mixer 17 by the open condition of switching circuit 23.

Figure 2:
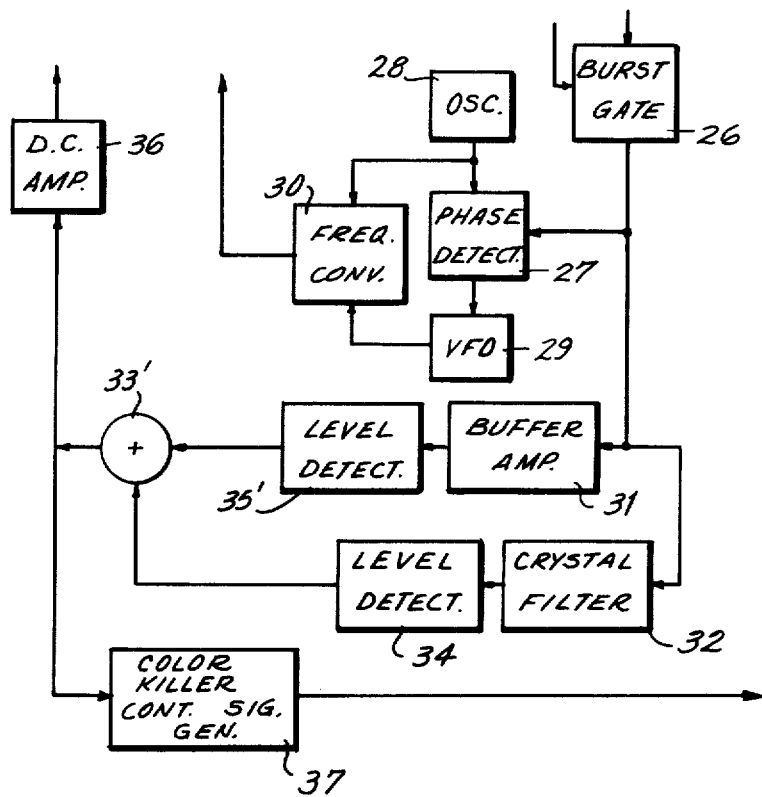
FIG. 2 is a fragmentary schematic diagram corresponding to a portion of FIG. 1, but showing a circuit arrangement according to another embodiment of the invention.

Although the embodiment of the invention illustrated on FIG. 1 combines, in adding circuit 33, the output of burst gate 26 passing through buffer amplifier 31 as a carrier wave with the DC voltage issuing from level detector 34 in correspondence with the detected level of the output from crystal filter 32 and then detects, by means of the level detector 35, the level of the combined output signal issuing from adding circuit 33 so as to provide the gain control signal for amplifier 20, it will be apparent that other arrangements may be provided for controlling the gain of amplifier 20 in accordance with the conbined levels of the output of burst gate 26 and the output of crystal filter 32, respectively. For example, if desired, the level detector 34 may be interposed in the circuit between buffer amplifier 31 and adding circuit 33, rather than between filter 32 and adding circuit 33, to provide a DC signal which corresponds to the level of the output of buffer amplifier 31. In such case, adding circuit 33 would superimpose the output of crystal filter 32 as a carrier wave upon the DC signal from the repositioned detector 34 which corresponds to the level of the output of burst gate 26 passing through buffer amplifier 31, whereupon level detector 35 would again provide a DC signal corresponding to the level of the combined output from adding circuit 33. Further, as shown specifically on FIG. 2, the output of buffer amplifier 31 may be level detected by a detector 35' to provide a corresponding DC signal applied to one input of an adding circuit 33', while the level detector 34 detects the level of the output from crystal filter 32 and provides another DC signal applied to the respective input of adding circuit 33', in which case adding circuit 33' adds the two DC signals applied thereto and provides a corresponding combined DC output signal which is applied through the DC amplifier 36 to the variable gain amplifier 20 as the gain control signal for the latter.

It will be seen that, in all of the described embodiments of this invention, the gain control signal applied to amplifier 20 represents a combination of the levels of the output of burst gate 26 and the output of crystal filter 32, respectively. Therefore, the level of the burst signal passing through crystal filter 32 during the reproducing of a color video signal is added to the level of the burst signal then passing directly from the output of gate 26 through buffer amplifier 31. By reason of the foregoing, the ringing wave that results from the very high Q or resonance factor of crystal filter 32 upon each application of the burst signal thereto has a relatively small amplitude in proportion to the combined or added levels which make up the gain control signal for amplifier 20 and therefore has a relatively small or insignificant influence on the level controlling operation of amplifier 20. Similarly, when the crystal filter 32 detects variations in the frequency of the extracted burst signal arising from time base errors in the reproduced composite signal, the proportionate change in the gain control signal is reduced to minimize the false compensation of the variable gain amplifier 20 therefor.

Further, when a monochrome or black-and-white video signal is being reproduced and such video signal is recorded with its lower side band extending into the frequency band that is occupied by the frequency-converted chrominance component when a color video signal is recorded, for example, as at Y'$_{FM}$ on FIG. 3, the lower side band of the reproduced monochrome video signal may pass through low pass filter 19 and be extracted by burst gate 26 so as to provide an output from the latter. However, such output of burst gate 26 during the reproducing of a monochrome video signal is outside of the very narrow pass band of crystal filter 32 so that there is substantially no output therefrom with the result that the DC signal from level detector 35 (FIG. 1) or from adding circuit 33' (FIG. 2) has a very substantially reduced level at which color killer control signal generator 37 is effective to changeover switching devices 14 and 23 to the condition shown in broken lines for ensuring the proper reproduction of the monochrome video signal, as previously described.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for reproducing a signal recorded on a record medium and which includes an information signal and a reference signal of a predetermined frequency occurring only during spaced intervals, comprising transducer means for reproducing the signal recorded on the record medium, variable gain amplifier means receiving the reproduced signal and providing a controlled level reproduced signal, gate means receiving said controlled level reproduced signal and being controlled in synchronism with said spaced intervals so as to provide a first output signal including said reference signal during each of said intervals, filter means coupled to said gate means and tuned to said predetermined frequency for receiving said first output signal and passing only said reference signal therein so as to produce a second output signal, combining means coupled to receive said first and second output signals for combining the levels of said first output signal as provided by said gate means and said second output signal as produced by said filter means, and means for controlling the gain of said variable gain amplifier means in accordance with said combined levels of said first and second output signals.

2. Apparatus according to claim 1; in which said means for controlling the gain of the variable gain amplifier means includes level detecting means for detecting the level of one of said first and second output signals, adding means for superposing the output of said level detecting means on the other of said first and second output signals so as to provide a combined output signal, and level detecting means for detecting the level of said combined output signal and providing a corresponding gain control signal for said variable gain amplifier means.

3. Apparatus according to claim 1; in which said means for controlling the gain of the variable gain amplifier means includes first and second level detecting means for respectively detecting the levels of said first and second output signals, and adding means for adding the levels detected by said first and second level detecting means and providing a corresponding gain control signal for said variable gain amplifier means.

4. Apparatus for reproducing a color video signal from a composite signal recorded on a record medium and which includes a chrominance component containing a burst signal occurring only during space intervals, comprising transducer means for reproducing the composite signal recorded on the record medium, variable gain amplifier means receiving said chrominance component of the reproduced composite signal and having an output at which a level-controlled chrominance component is provided, gate means receiving said level-controlled chrominance component and being controlled in synchronism with said spaced intervals so as to provide a first output signal during each of said intervals, filter means coupled to said gate means for receiving said first output signal and being tuned to a predetermined frequency for passing only said burst signal so as to produce a second output signal, combining means coupled to receive said first and second output signal for combining the levels of said first output signal as provided by said gate means and said second output signal as produced by said filter means, and means for controlling the gain of said variable gain amplifier means in accordance with said combined levels of said first and second output signals.

5. Apparatus according to claim 4; in which said means for controlling the gain of the variable gain amplifier means includes level detecting means for detecting the level of one of said first and second output signals, adding means for superposing the output of said level detecting means on the other of said first and second output signals so as to provide a combined output signal, and level detecting means for detecting the level of said combined output signal and providing a corresponding gain control signal for said variable gain amplifier means.

6. Apparatus according to claim 4; in which said means for controlling the gain of the variable gain amplifier means includes first and second level detecting means for respectively detecting the levels of said first and second output signals, and adding means for adding the levels detected by said first and second level detecting means and providing a corresponding gain control signal for said variable gain amplifier means.

7. Apparatus according to claim 4; in which said composite signal, as recorded on the record medium, has said chrominance component and the burst signal contained therein frequency-converted to a frequency band lower than a standard band therefor; and said recorded composite signal further includes a frequency-modulated luminance signal in a band above said frequency band of the frequency-converted chrominance component; and further comprising separating means for separating said frequency-modulated luminance signal and said frequency-converted chrominance component from the reproduced composite signal, frequency-demodulating means receiving the separated frequency-modulated luminance signal for providing a demodulated luminance signal therefrom, frequency-converting means receiving said level-controlled chrominance component for frequency-reconverting the latter to said standard band therefor, and adding means for combining said demodulated luminance signal with the frequency-reconverted chrominance component so as to provide a color video signal corresponding to the recorded composite signal.

8. Apparatus according to claim 7; further comprising color killer means operative to disconnect said frequency-converting means from said adding means, and means for controlling said color killer means in accordance with said combined levels of said first and second output signals so that said color killer means is operative only when said combined levels decline below a predetermined value.

9. Apparatus according to claim 8; in which said separating means includes high pass filter means and low pass filter means for separating said frequency-modulated luminance signal and said frequency-converted chrominance component, respectively, from the reproduced composite signal, and said color killer means is further operative to by-pass said high-pass filter means for applying the reproduced composite signal directly to said demodulating means.

10. Apparatus according to claim 7; in which said frequency-converting means includes means for generating a reference signal, means utilizing said reference signal for said frequency-reconverting of the level-controlled chrominance component to said standard band, and means for controlling the phase of said reference signal in response to the burst signal extracted from said level-controlled chrominance component following said frequency-reconverting thereof.

* * * * *